Patented Dec. 12, 1922.

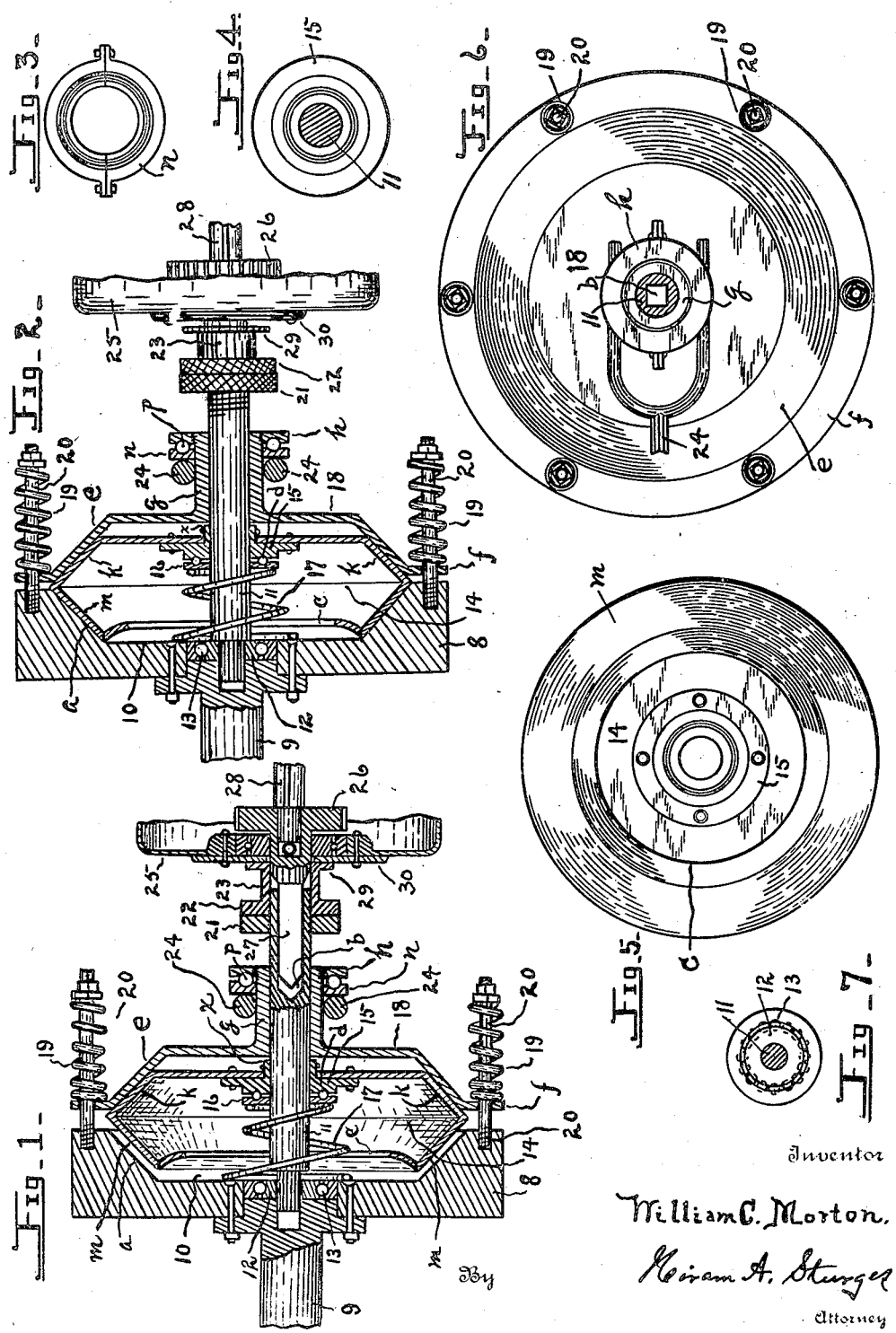

1,438,457

UNITED STATES PATENT OFFICE.

WILLIAM C. MORTON, OF OMAHA, NEBRASKA, ASSIGNOR OF ONE-THIRD TO IRA O. MORTON AND ONE-THIRD TO JOSEPH P. CONDON, BOTH OF OMAHA, NEBRASKA.

WHEEL CLUTCH.

Application filed January 3, 1922. Serial No. 526,797.

*To all whom it may concern:*

Be it known that I, WILLIAM C. MORTON, a citizen of the United States, residing at Omaha, in the county of Douglas and State of Nebraska, have invented certain new and useful Improvements in a Wheel Clutch, of which the following is a specification.

This invention relates to an improved wheel clutch useful in instances where it is desired to control actuation of a secondary shaft driven by a primary, revoluble shaft, the device being of particular advantage in connection with the fly wheel of an automobile or other motor driven vehicle for controlling the movements of a transmission shaft, and has for its objects to provide such a construction that the area of the contacting parts for causing friction will be greater and will occupy a lesser space than ordinary, the parts to be so arranged that they may be conveniently operated and during operation will avoid shocks, jolts or undue vibration.

In the accompanying drawing which illustrates the invention, Fig. 1 is a view of the device in longitudinal section, showing a clutch-drum engaging an actuating plate and disengaged from a fly wheel. Fig. 2 is a similar view showing the clutch-drum engaging the fly wheel. Fig. 3 is a side view of a bearing-plate for the fork. Fig. 4 is a side view of a bearing-plate for the clutch-drum, a clutch-shaft in transverse section being added. Fig. 5 is a side view of the clutch-drum. Fig. 6 is a side view of the actuating-plate. Fig. 7 is a side view illustrating ball bearings for the clutch-shaft.

Referring now to the drawing, the invention is shown and described in connection with a fly wheel 8 adapted to be rotated by a shaft 9, and provided with an annular recess 10 having an outwardly divergent wall $a$. At 11 is indicated a clutch-shaft provided, to open on its outer end, with a recess $b$ (Fig. 1. 6.) angular in cross-section and having its inner end journalled in a bearing-ring 12 carried by the fly wheel, and being longitudinally movable with reference to said wheel; and said fly wheel may revolve without causing rotation of the clutch-shaft, the balls 13 preventing appreciable friction.

Numeral 14 indicates a clutch-drum formed as a circular receptacle having a periphery of cone-shape, said drum having an opening $c$ formed in one of its sides, and upon its side opposite to said opening, and within said receptacle and centrally thereof, is secured an apertured bearing-plate 15 provided with a circular groove and having a flange $x$ secured to the clutch-shaft, whereby the drum will move with said plate 15 and clutch-shaft.

Numeral 16 indicates an apertured bearing-plate loosely mounted on the shaft 11 and disposed adjacent to the plate 15, said plate 16 having a circular groove formed in one of its sides; and balls $d$ are disposed between the plates 15 and 16 in said grooves. At 17 is indicated a coiled spring disposed with one of its ends abutting upon the fly wheel, its opposite end being pressed against the plate 16, said spring tending to disengage the drum from the fly wheel.

Numeral 18 indicates an actuating-plate formed as a container having an outwardly divergent wall $e$ provided with a terminal apertured flange $f$, and provided centrally with a sleeve $g$ having a grooved bearing-ring $h$ threaded thereon, and resilient means are provided for normally pressing the wall $e$ of the plate 18 against the outwardly convergent wall $k$ of the drum, said means consisting of springs 19 mounted on bolts 20 which traverse the apertures of the flanges $f$ and which are threaded in the fly wheel, and since the force of the spiral springs 19 is greater than the force of the spring 17, the wall $e$ will be pressed against the wall $k$ by force of said springs 19 so that the outwardly convergent wall $m$ of the drum will engage the wall $a$ of the fly wheel for revolving the drum and shaft 11.

Means are provided for limiting the outward movement of the shaft 11, consisting of a pair of nuts 21 and 22 which are threaded on the shaft near its outer end, the nut 22 being provided with a sleeve 23 adapted to abut upon the stationary gear case 25, and by rotating the nuts the outer end of the shaft 11 may be maintained nearer to or further from the gear case, as may be required for determining the degree of the longitudinal movement of said shaft.

Any suitable means may be employed for moving the actuating-plate 18 outwardly from the drum 14, the means herein shown being a fork 24 under control of an operator, and which may have an outward swinging movement for that purpose, a grooved bearing-ring $n$ being interposed between the fork and the bearing-ring $h$ and balls $p$ being employed for eliminating friction.

In operation, the parts will normally be disposed as shown in Fig. 2, the springs 19 causing the wall $e$ of the actuating-plate to be pressed firmly against the wall $k$ of the drum, the wall $m$ of the drum being pressed against the wall $a$ of the fly wheel and on account of the comparatively large area of these contacting parts the revoluble movement of the fly wheel will be imparted to the drum in such a manner that the clutch-shaft will be rotated. However, the engagement of the surfaces mentioned will not cause jars or shocks since the drum may slide on the wall $a$ before the pressure is complete.

When the fork is moved outwardly against the plate $n$ the springs 19 will be retracted and the drum will be disengaged from the fly wheel by action of the spring 17, the shaft 11 moving outwardly until the sleeve 23 abuts upon the gear case, and it will be understood that a further outward movement of the actuating-plate, by use of the fork 24, will cause it to become disengaged from the drum, and while thus disengaged, the fly wheel and actuating-plate may rotate without causing any revoluble movement of the drum and shaft 11.

It will be understood that the gear wheel 26 within the gear case will be rotated by the revoluble movement of the shaft 11, said wheel 26, for this purpose having a stub shaft 27, angular in cross-section disposed in the recess $b$ of said shaft 11, a nest of gears (not shown) being disposed in the gear case and being actuated by the wheel 26 for rotating a transmission shaft 28. Since the present invention does not include the mechanism within the gear case it is not considered necessary to describe the parts therein.

It will be appreciated that only a limited longitudinal movement of the shaft 11 will generally be required for disengaging the drum from the fly wheel, and since the shaft 11 may be adjusted longitudinally by means of the nuts 21 and 22, the distance to which the drum may move from the fly wheel may be conveniently regulated.

During operation, the nut 21 may act as a buffer for the end of the sleeve $g$, and limit the outward slidable movement, on the shaft 11, of said sleeve and the plate $e$.

The sleeve 23 is provided with a flange or brake-member 29, adapted to engage or disengage the plate 30 of the stationary gear case, and in operation, when the actuating-plate 18 is moved outwardly by a swinging movement of the fork 24 and against the force of springs 19, said member 29, by operation of the spring 17 may engage the plate 30.

It will be understood that changes in form, size, proportion and minor details may be made, as found to be of advantage, said changes being determined by the scope of the invention as claimed.

What I claim and desire to secure by Letters Patent is,—

1. In a clutch for a revoluble wheel having a circular recess provided with an outwardly divergent wall, a shaft journalled in the wheel to permit sliding movements axially thereof, a drum mounted on the shaft and having an outwardly convergent wall, resilient means tending to prevent engagement of the drum with said wheel, an actuating-plate slidingly mounted on the shaft and having an outwardly divergent wall, and means for moving the actuating-plate for causing engagement of the convergent wall of the drum with the divergent wall of the recess of said wheel.

2. In a clutch for a revoluble wheel having a circular recess provided with an outwardly divergent wall, a shaft journalled in the wheel to permit sliding movements axially thereof, a drum within said recess and mounted on the shaft and having opposed, outwardly convergent walls terminating at its periphery, resilient means for pressing the drum and shaft outwardly from the wheel, an actuating-plate slidingly mounted on the shaft and having an outwardly divergent wall, and means for moving the actuating plate to cause engagement of its divergent wall with one of the convergent walls of the drum and to cause engagement of the opposite convergent wall of the drum with the divergent wall of the recess of said wheel.

3. In a clutch for a revoluble wheel having a recess provided with a circular outwardly divergent wall, a shaft journalled in the wheel to permit longitudinal movements thereof, a drum mounted on the shaft, said drum having a terminal wall disposed in said recess and inclined toward its medial line and having a second terminal wall inclined toward its medial line and disposed outwardly of said recess, a spring tending to press the drum outwardly from said wheel, a circular actuating-plate slidingly mounted on the shaft and having an outwardly divergent wall near its periphery, means to limit the longitudinal movements of the shaft, and means for moving the actuating-plate longitudinally of the shaft to cause its divergent wall to engage the second inclined wall of the drum and to cause the first named inclined wall of the drum to engage the outwardly divergent wall of the recess of said wheel.

In testimony whereof, I have affixed my signature in presence of two witnesses.

WILLIAM C. MORTON.

Witnesses:
HIRAM A. STURGES,
ARTHUR H. STURGES.